United States Patent
Comploi

(10) Patent No.: US 9,610,510 B2
(45) Date of Patent: Apr. 4, 2017

(54) SENSING AND MANAGING VEHICLE BEHAVIOR BASED ON OCCUPANT AWARENESS

(71) Applicant: DISNEY ENTERPRISES, INC., Burbank, CA (US)

(72) Inventor: Dumene Comploi, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 5 days.

(21) Appl. No.: 14/804,451

(22) Filed: Jul. 21, 2015

(65) Prior Publication Data

US 2017/0021282 A1 Jan. 26, 2017

(51) Int. Cl.
*B60W 40/08* (2012.01)
*G05D 1/00* (2006.01)
*A63G 25/00* (2006.01)

(52) U.S. Cl.
CPC .......... *A63G 25/00* (2013.01); *B60W 40/08* (2013.01); *G05D 1/0088* (2013.01); *B60W 2040/0872* (2013.01); *B60W 2420/42* (2013.01)

(58) Field of Classification Search
USPC .............. 701/408, 300, 23; 180/7.1; 901/1
See application file for complete search history.

(56) References Cited

U.S. PATENT DOCUMENTS 4,565,487 A * 1/1986 Kroczynski ............ B62D 57/02
180/8.6
6,882,917 B2 * 4/2005 Pillar ..................... A62C 27/00
180/65.27

(Continued)

FOREIGN PATENT DOCUMENTS

CN 101316638 B * 5/2010 ............... A63G 7/00
EP 1960072 A2 * 8/2008 ............... A63G 7/00

(Continued)

OTHER PUBLICATIONS

All-terrain vehicles frequency domain response analysis and rider behavior; F. A. Forouhar; Control Applications, 1997., Proceedings of the 1997 IEEE International Conference on; Year: 1997; pp. 183-188, DOI: 10.1109/CCA.1997.627535.*

(Continued)

*Primary Examiner* — Cuong H Nguyen
(74) *Attorney, Agent, or Firm* — Marsh, Fischmann & Breyfogle LLP; Kent A. Lembke

(57) ABSTRACT

A method for controlling a ride experience through a ride space of an amusement park ride. The method includes, with a sensor mounted on an automated trackless vehicle being controlled to travel along a first ride path, sensing passenger data for a passenger. The method involves processing the passenger data to determine a passenger state at a particular point in time during the ride experience. The method includes determining a location of the automated trackless vehicle on the first ride path. The method involves, based on the passenger state and the location of the automated trackless vehicle on the first ride path, determining a second ride path for the automated trackless vehicle to move through the ride space. The method includes controlling the automated trackless vehicle to move off the first ride path and along the second ride path, e.g., to alter the passenger's state to enhance the ride experience.

20 Claims, 5 Drawing Sheets

(56) References Cited

U.S. PATENT DOCUMENTS

| | | | | |
|---|---|---|---|---|
| 7,788,215 | B2* | 8/2010 | Trowbridge | A63G 7/00 707/602 |
| 8,964,298 | B2* | 2/2015 | Haddick | G06F 3/013 359/630 |
| 9,038,543 | B2* | 5/2015 | Beutler | A63G 4/00 104/53 |
| 2004/0002794 | A1* | 1/2004 | Pillar | A62C 27/00 701/1 |
| 2007/0121957 | A1* | 5/2007 | Trowbridge | A63G 7/00 381/61 |
| 2008/0251575 | A1* | 10/2008 | Bowling | G06F 17/30793 235/375 |
| 2011/0174189 | A1* | 7/2011 | Beutler | A63G 4/00 104/53 |
| 2013/0127980 | A1* | 5/2013 | Haddick | G06F 3/013 348/14.08 |
| 2013/0278631 | A1* | 10/2013 | Border | G02B 27/017 345/633 |
| 2015/0323926 | A1* | 11/2015 | Wang | G05B 19/0423 700/19 |
| 2016/0195856 | A1* | 7/2016 | Spero | G06N 5/046 700/90 |

FOREIGN PATENT DOCUMENTS

| | | | | |
|---|---|---|---|---|
| EP | 1960072 B1 * | 1/2014 | | A63G 7/00 |
| WO | WO 2007064562 A3 * | 7/2007 | | A63G 7/00 |

OTHER PUBLICATIONS

Visual analytics for detecting communication patterns; William Hatton et al.; Visual Analytics Science and Technology (VAST), 2015 IEEE Conference on; Year: 2015; pp. 137-138, DOI: 10.1109/.*

Active control for single camera SLAM; T. Vidal-Calleja; A. J. Davison; J. Andrade-Cetto; D. W. Murray; Proceedings 2006 IEEE International Conference on Robotics and Automation, 2006. ICRA 2006; Year: 2006; pp. 1930-1936, DOI: 10.1109/ROBOT.2006. 1641988.*

Visually guided manipulation using active camera-lens systems; B. J. Nelson; P. K. Khosla; Proceedings of International Conference on Robotics and Automation; Year: 1997, vol. 1; pp. 437-442 vol. 1, DOI: 10.1109/ROBOT.1997.620076.*

Optimizing hand/eye configuration for visual-servo systems; R. Sharma; S. Hutchinson; Proceedings of 1995 IEEE International Conference on Robotics and Automation; Year: 1995, vol. 1; pp. 172-177 vol. 1, DOI: 10.1109/ROBOT.1995.525281.*

* cited by examiner

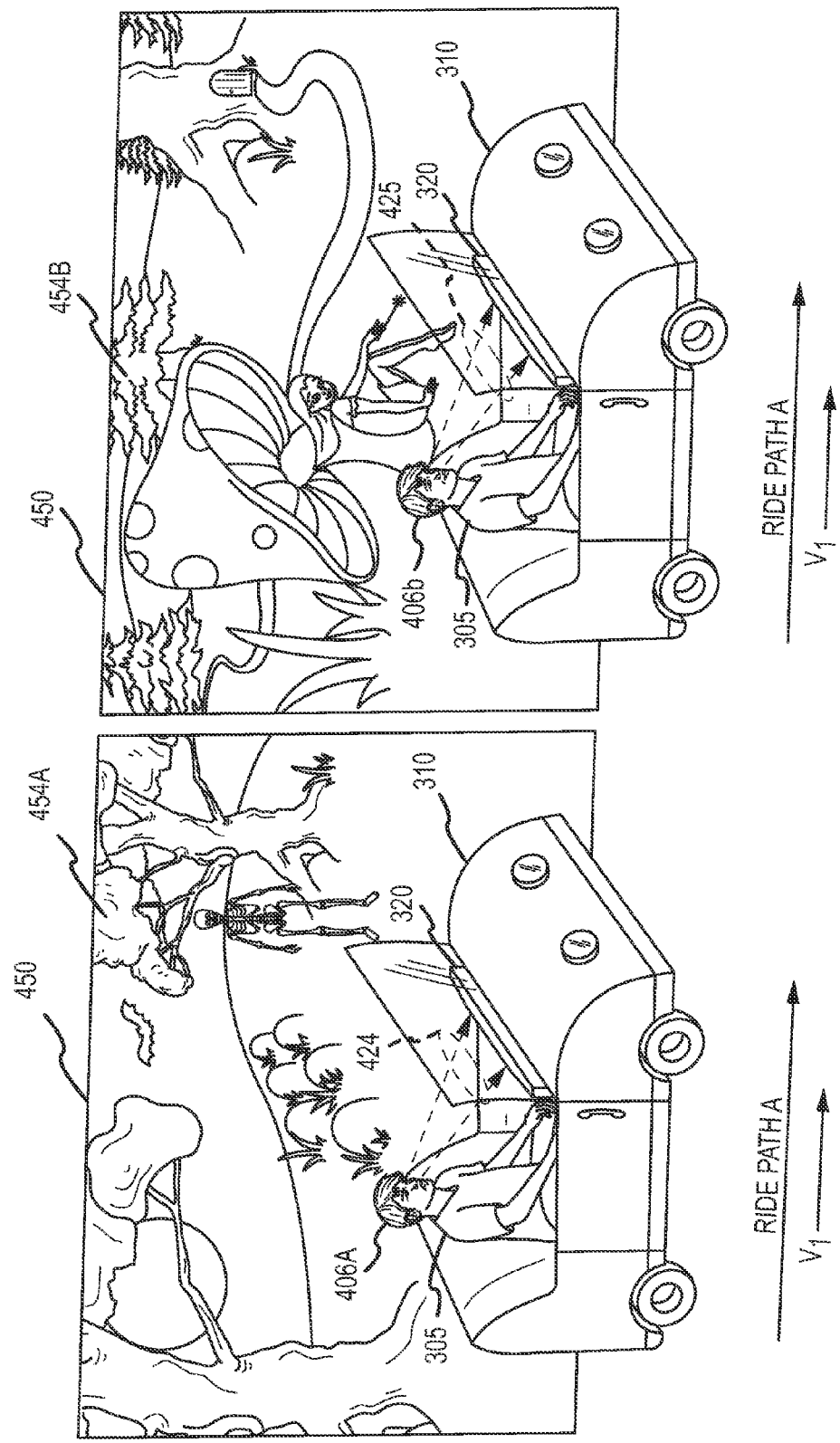

SENSING AND MANAGING VEHICLE BEHAVIOR BASED ON OCCUPANT AWARENESS

BACKGROUND

1. Field of the Description

The present invention relates, in general, to methods and systems for controlling or managing passenger vehicles and systems external to such vehicles as the vehicles pass nearby, and, more particularly, to methods and systems engaging and entertaining passengers of vehicles such as trackless vehicles in an amusement park, autonomous cars, automated guided vehicles (AGVs), and the like.

2. Relevant Background

There is a growing trend in the transportation industry towards use of vehicles that do not require passenger interaction to control navigation of the vehicle through a space or over roads. For example, amusement or theme parks have recently designed and implemented trackless dark rides, and these rides feature ride systems where automated guided vehicles (AGVs) or trackless vehicles are utilized instead of the more conventional vehicles that run on guide rails or tracks. Trackless ride vehicles may be controlled to cross over existing paths, to reverse direction, and to rotate in contrast to tracked vehicles that are constrained to follow a ride path defined by a track. Some trackless rides may rely upon a set of buried wires for controlled navigation while others may rely on a ride control system that uses Wi-Fi-based, RFID-based, or other positioning systems to track the present position of each vehicle and to move the vehicles through a ride space including positioning vehicles near to show elements such as animatronic-based and/or video-based entertainment displays. Ride throughput is managed by the ride control system typically by moving each vehicle through the ride space in a predefined amount of time even though each vehicle can move along a unique path through the ride space.

As another example, the transportation industry has recently been designing and prototyping autonomous cars, which are also known as driverless cars, auto self-driving cars, and robotic cars. Some states in the United States anticipate issuing licenses for such vehicles in the near future. An autonomous car is capable of fulfilling the main transportation capabilities of a conventional automobile without driver or passenger input. A typical autonomous car is configured to be capable of sensing its external environment and, in response, to navigate without human input. Autonomous vehicles sense their surroundings with such techniques as radar, lidar, global positioning system (GPS), and computer vision. Advanced control systems interpret the sensory information about their external environment to identify appropriate navigation paths as well as relevant signage and any stationary or moving obstacles in their path. Autonomous vehicles are capable of updating their maps based on sensory input of the external environment to allow them to keep track of their position even when conditions change.

In this description, all of these types of "driver-less" vehicles may be grouped together and labeled as "automated trackless vehicles." In the theme park setting, the automated trackless vehicle has been designed, modeled, and controlled with an entirely passive passenger. Similarly, in the transportation setting, automated trackless vehicle research has been directed at making the "driver" a passive participant by essentially disengaging the driver from the activity of driving or navigating their car.

SUMMARY

The inventor recognized that with the increased use of automated trackless vehicles that, in contrast to prior design approaches of making passengers passive participants, there is a need and demand for engaging the vehicle passenger(s) to make the ride or drive more enjoyable and entertaining. With this in mind, a method and system is taught herein for controlling operations of an automated trackless vehicle based on a current state of at least one of the vehicle's passengers (e.g., the "driver").

The passenger's state is determined by actively sensing the passenger's in-vehicle experience such as by determining their emotional state or level of attentiveness. The vehicle may then have its drive and navigation system operated based on the passenger state. For example, a theme park ride may utilize the control method of the present description, and an automated trackless vehicle may be moved along a first path in a ride space during a first time period and then along a second path (defined by locations and/or travel rate) in the ride space during a second time period in response to a detected passenger state (e.g., move faster through the space or to a new show element if the passenger is "bored" or inattentive or move slower or even stop at a show element if the passenger is "excited" or very attentive).

More particularly, a method is described for controlling a ride experience through a ride space of an amusement park ride. The method includes, with a sensor mounted on an automated trackless vehicle being controlled to travel along a first ride path or provided in such a vehicle (e.g., a wearable system such as a smart watch or the like), sensing passenger data for a passenger of the automated trackless vehicle. The method also involves processing the passenger data to determine a passenger state at a particular point in time during the ride experience. Then, the method includes determining a location of the automated trackless vehicle on the first ride path. Significantly, the method involves, based on the passenger state and the location of the automated trackless vehicle on the first ride path, determining a second ride path for the automated trackless vehicle to move through the ride space. Then, the method includes controlling the automated trackless vehicle to move off the first ride path and along the second ride path, e.g., to alter the passenger's state to enhance the ride experience. The ride experience can be enhanced simply by the fact that this system can eliminate a theoretical hourly ride capacity and transform it into a measurable variable ride capacity in some implementations.

In some implementations, the sensor includes a camera and the passenger data includes a digital image of the face of the passenger. Then, in the method, the passenger state may be an emotional state or a level of attention of the passenger, and the processing step may include comparing the emotional state or the level of attention with ranges of values for emotional state or level of attention, respectively, that are predefined for the amusement park ride. In other cases, though, the passenger data may be a physiological parameter of the passenger (such as their heart rate or the like). Then, the processing step may involve comparing the physiological parameter with a range of goal values for the physiological parameter for a passenger during the ride experience. In other cases, the physiological parameter may be a measure of their physical comfort in the vehicle, such as whether they are perspiring, show indications of being uncomfortably cold, or otherwise are comfortable with the present temperature within the vehicle, and the vehicle's onboard equipment (e.g., heater or A/C system) may be operated to modify the passenger's comfort level (e.g., to heat or cool the vehicle interior to achieve a new temperature or new cabin temperature range).

In these or other cases, the passenger data includes identifying information for the passenger. Then, the processing step may include determining an identification of the passenger and, based on the identification, retrieving expectations for the ride experience for the passenger. In other implementations, the experience can be affected by data from outside sensing systems/sensors or by data pertaining to activities outside of the vehicle (e.g., queuing time in a ride, traffic on a city or other street/highway such as measured by ATSAC or provided by an application such as a smartphone app or the like).

To practice the method, the ride space may include first display elements along the first ride path and second display elements along the second ride path that differ from the first display elements, whereby the second ride path is selected during the ride experience to alter the passenger state by exposing the passenger to differing display elements that may change or improve their passenger state. In some cases, prior to the controlling of the automated trackless vehicle to move along the second ride path, the method includes switching the operation of at least one of the first display elements from a first set of operating parameters to a second set of operating parameters based on the passenger state. Further, the operating parameters may include content displayed upon one or more display surfaces viewable by the passenger as the automated trackless vehicle moves along the first ride path, whereby the content is chosen based on the passenger state.

BRIEF DESCRIPTION OF THE DRAWINGS

FIGS. 4A and 4B illustrate a portion of a ride system, similar to FIGS. 3A and 3B, illustrating its operations to modify operation of a display element (e.g., changing displayed content) in response to passenger state.

DETAILED DESCRIPTION

Figure 1:
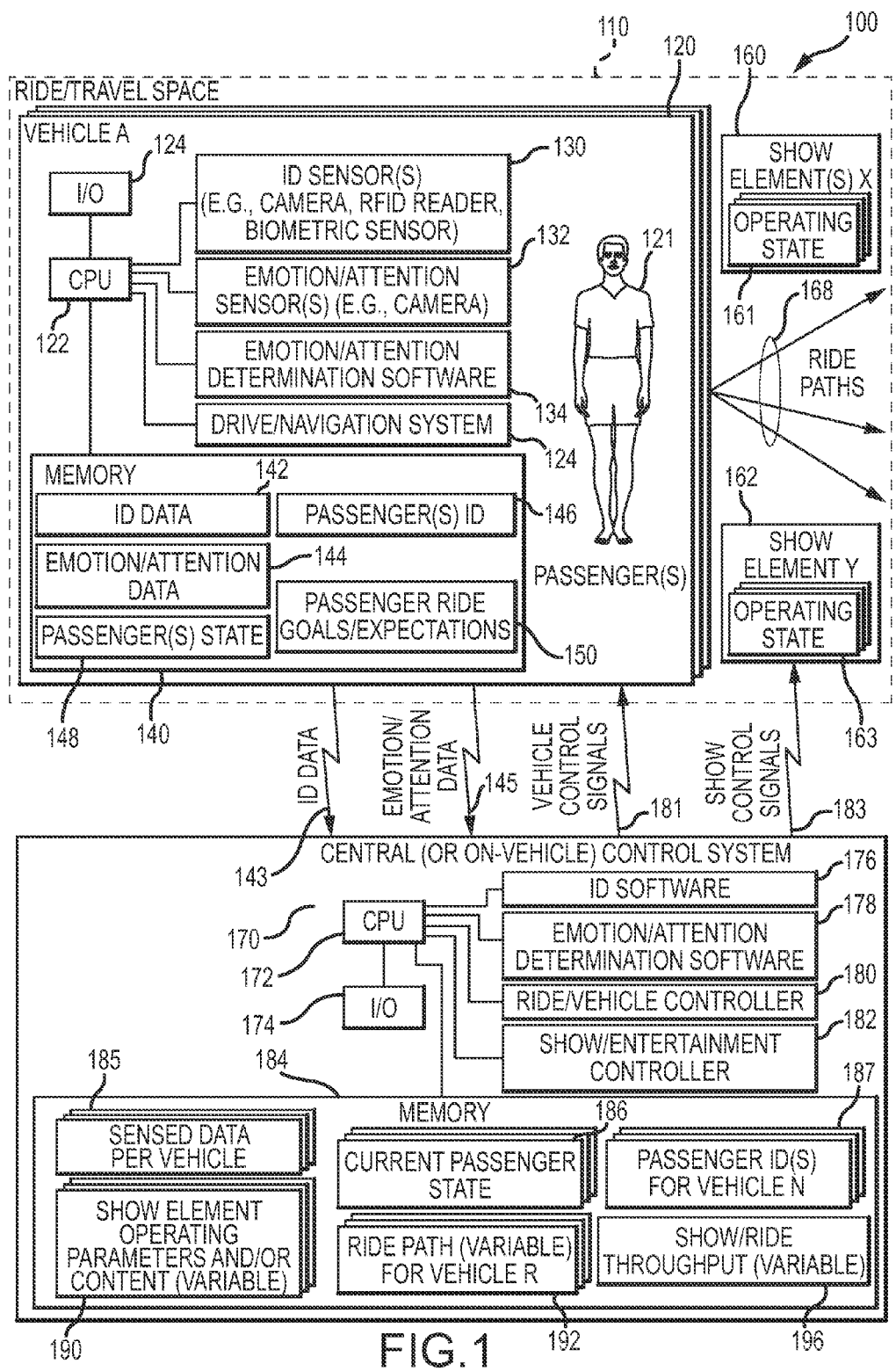
FIG. 1 is a schematic or functional block drawing of a ride or ride system operating to manage progression of a vehicle through a ride or travel space and/or show element operations based on a determined "state" of a passenger of the vehicle.

The following description is directed toward sensing and managing vehicle behavior based on a sensed and/or determined state of a vehicle passenger. Here, the term "state" of a passenger is intended to have a broad meaning and may correspond with a level of attentiveness, with an emotional state, or with other passenger characteristics relating to a ride experience. Briefly, the control methods and systems taught herein address two problems that are surprisingly related. First, in theme park rides, the historical design has been that of an entirely passive passenger. Second, autonomous trackless vehicles used for general transportation are being designed to make the driver a passive participant by essentially disengaging the driver from all driving and navigation responsibilities. Both of these trends can benefit from use of the control methods and systems described as these involve sensing and dynamically managing the passenger's experience (e.g., vehicle movements and operation of exterior and/or interior systems) using sensed information from inside the vehicle cabin (or combined with information about the environment or activities external to the vehicle such as overall "traffic" information or the like, with traffic pertaining to a ride and its queues and/or throughput, to vehicle traffic/congestion on a planned route over roads traveled by an automated vehicle, and the like).

Outside of the amusement park industry, there are currently multiple efforts to provide automated trackless vehicles. Innovation has accelerated in the field of labor intensive computer vision computation of sensed external environment data in order to allow better navigation and control to facilitate the introduction of the automated trackless vehicles (e.g., autonomous vehicles) onto our streets and into our daily lives. With the beginning of 2015 in California, licenses will be available for automated trackless vehicles. Additionally, the city of Los Angeles, Calif. has already introduced a unique traffic control system for its urban street network during the Olympics in 1984 and is currently planning on introducing artificial intelligence to further improve and expand this system. The traffic control system provides real-time monitoring and adjustment of signal timing for nearly 4,400 signalized intersections citywide. The traffic control system has been shown to reduce travel time by 12 percent and to increase speeds by 16 percent. The combination of a macro-city brain and single automated response to environmental sensing will further revolutionize vehicle driver's dynamic behavior (e.g., introduction of diverse smart phone applications have heavily impacted certain areas in the Los Angeles) and also affect navigation of automated trackless vehicles in communication with the traffic control system.

In the amusement park industry, there has been considerable effort in the past years toward developing dynamic ride experiences including dynamic storytelling with ride show or display elements that respond to passenger participation and including dynamic ride vehicles. The introduction of trackless vehicles has introduced new opportunities for localizing the experience of a show. For example, sensors have been provided on ride paths to detect the presence of a ride vehicle and show elements have been operated in response to the detected presence of a ride vehicle. Also, projection mapping has been used to enhance the creation of dynamic environments; currently, methods for using expensive computation to sense and predict the path of vehicles through a ride space are being developed.

The inventor believes that there is an immediate need in ride vehicles and an eventual need in self-driving vehicles to manage (or at least sense/detect) the attention of the vehicle occupants or passengers and, in response, to manage the vehicle behavior in a way that achieve experience goals. For example, in a theme park, an automated trackless vehicle may be operated to meet the goals of storytelling and entertainment whereas outside the theme park an automated trackless vehicle (e.g., a self-driving car) may be operated/ controlled to meet the goal of providing safe and efficient transit. In both cases, though, the solution involves sensing the passenger's state and responding with vehicle control in a manner that satisfies these goals. For example, in a theme park ride, the response to a passenger's state may be changing course from a default or first ride path to another a differing second ride path and/or may be dwelling on a scene or nearby a show/ride element that is interesting to the vehicle passenger(s) while shortening the time spent on scenes/show or ride elements that are not engaging (including skipping such scenes in some cases). External events such as lighting, sound, and other show/ride elements may have their operations controlled to change in response to the sensed/determined state of the passenger(s) of the automated trackless vehicle (e.g., based on the present level of attentiveness of the passenger(s)).

With regard to automated trackless vehicles outside of theme parks, current research for self-driving vehicles is directed toward replacing the driver and their input so that the vehicle's passengers can let their attention wander and/or concentrate on non-driving activities. In direct contrast, the method and system of the present description involves techniques of managing a passenger's attention rather than letting it wander or allowing the attention to wander within bounds so that the transportation goal is also achieved. This can be considered another aspect of the problems being solved with a theme park ride of the present description, and, as a result, the following description will concentrate upon and give examples of ride systems and control methods with the understanding that these examples can readily be implemented within the transportation environment with self-driving vehicles and systems external to these vehicles (e.g., change a display along a roadway based on a sensed state of a passenger in a nearby or passing vehicle and/or compare emotional data of the "driver" or other passengers with traffic conditions and change the vehicle operation and/or external system operations based on this emotional response).

The systems taught herein include an automated trackless vehicle (e.g., a free ranging autonomous passenger vehicle) with inward-facing and, in some cases, outward-facing sensing technology to determine a passenger state. The systems also include a reactive show-programming system to personalize the ride experience inside the automated trackless vehicle and dynamically control the ride experience as a whole. The systems can be designed under the presumption that the use of an automated trackless vehicle responds to the time of the day's actual hourly ride capacity along with response to a passenger's state (e.g., attention or engagement level, emotional state, or the like that may be determined based on sensed information (from a camera, from biometric sensors, and so on) for facial recognition or biometric analysis). In other words, the system includes control programs for monitoring the traffic of vehicles through a ride and may vary the movement of vehicles through the ride based on determined passenger state such as by changing queues, pathways, and duration of the ride based on passenger states while also meeting hourly ride capacity goals for the ride.

As will become clear from the following description, inward sensing is one way to better understand a passenger's current state. Particularly, the passenger's state may be defined as their focus of attention or may be a measure of their emotions. In other cases, the "state" of the passenger may include a determination of whether the passenger is a first time participant of a ride or whether they have been on the ride two or more times as this state information may be used to select their ride path and duration/speed in certain portions (e.g., visit all show elements for a default period of time if first time participant or shorten duration of certain show elements or even skip some show elements or ride sections if the passenger is a repeat ride participant). In other cases, passenger expectations for a ride may be known by the control system based on an identification (ID) of the passenger (which may be determined using iris scanning, facial recognition, RFID techniques, or other technology such as if the passenger is wearing an RFID wristband). For example, the passenger may be a teenager and want to spend more time on the interactive show elements while a younger passenger may want to experience the whole storytelling aspect of a ride and the vehicles carrying these passengers may be controlled differently based on these expectations that are linked to the passenger IDs.

FIG. 1 is a schematic or functional block drawing of a ride or ride system 100 operable (or operating) to manage progression of a vehicle 120 through a ride or travel space 110 and/or to manage show element 160 operations based on a determined "state" of a passenger 121 of the vehicle 120. For example, the ride 100 may take the form of a dark or other type of ride in a theme or amusement park, and each of the vehicles 120 may be an automated trackless vehicle that is not tied to a track or rail but, instead, is free to move about a ride or travel space 110. The automated trackless vehicle 120 is a passenger vehicle and is configured to seat or support one or more passengers 121, and the system 100 is adapted to manage operation of at least the vehicle 120 based on a determined state 148 of the passenger 121 (or passengers).

The automated trackless vehicle 120 includes a drive and navigation system 124 that may include a drive train and motor/engine (e.g., a drive shaft coupled with wheels) that operates to move the vehicle 120, without user input from the passenger 121 being required, through the ride/travel space. Particularly, the drive and navigation system 124 may cause the vehicle 120 to follow one or more of the ride paths 168 (e.g., the vehicle can move between paths 168 or not follow a particular defined path as it is "trackless") through the ride space 110 to maintain or change the state 148 of the passenger 121. The drive and navigation system 124 may operate in response to receipt (by I/O devices 124 of the vehicle 120) of vehicle control signals 181 from the central/remote or on-vehicle control system 170 instead of requiring the passenger 121 to operate input devices (e.g., a steering wheel or the like, an accelerator, and brake pedals) such that it is "automated."

The control signals 181 may cause the drive and navigation system 124 to slow the vehicle 120 down such as when the passenger's state 148 corresponds with a higher level of attentiveness or interest or corresponds with a desired emotional state such as joy or excitement, and, in contrast, the control signals 181 may cause the system 124 to speed up the vehicle 120 or move the vehicle to another ride path 168 to experience a different show element 160 or 162 or skip a show element 160 or 162 when the passenger's state 148 corresponds to a undesired emotional state such as sadness or fear (or little to no emotion) or corresponds with a lower level of attentiveness (e.g., less than 4 on a scale of 1 to 10 with 10 being highly attentive).

The vehicle 120 includes a processor(s) 124 for managing operations of the input/output devices 124, which may provide wired or wireless communications with the control system 170 (e.g., transmitting signals with digital data including the ID data 143 and emotion/attention data 145 to the control system 170 and receiving the vehicle control signals 181 from the control system 170). The vehicle 120 also includes memory or digital data storage devices (e.g., one or more computer readable media that have embedded therein computer program code or computer executable instructions causing the vehicle 120 and/or processor 122 to perform the functions described herein). The memory 140 is used to store at least temporarily sets of data useful for managing operations of the vehicle 120 based on a state of the passenger 121.

To this end, the vehicle 120 is shown to include one or more ID sensors 130 for determining an identification of the passenger 121 (or passengers). For example, the ID sensor 130 may include a digital still and/or video camera that captures images of the face of the passenger 121 or a worn ID badge or the like. In other cases, the ID sensor 130 may include an RFID reader that reads data from an RFID-based ID element worn or held by the passenger 121 such as a passive or active RFID wristband, necklace, or pin/badge worn by the passenger 121. The read ID data may include the passenger's name 121 or an ID number associated uniquely with the passenger 121. In other cases, the ID sensor 130 may include a biometric sensor such as an iris scanner, a fingerprint reader, a palm print reader, or the like that detects or senses ID data useful for uniquely identifying the passenger(s) 121 of the vehicle 120. The ID data 142 may be temporarily stored in memory 140 and transmitted in signals 143 to the control system 170 for processing by ID software 176, which is run by a processor 172 in the control system 170.

The ID software 176 may include facial recognition software when the ID data 142, 143 includes digital images of the face of the passenger 121 or software for looking up name or ID number based on RFID data if the sensor 130 is an RFID reader. In other cases, the ID software 176 may include algorithms or software routines for retrieving a name or ID number based on biometric information in the ID data 142, 143. For each vehicle 120, the ID software 176 then acts to store the passenger ID(s) for the vehicle as shown at 187 in the memory 184 for later use in generating the vehicle control signals and/or the show control signals 183 (e.g., to personalize the operation of the show elements 160, 162 or movement of the ride vehicle 120 along one or more of the ride paths 168). In some cases, the passenger ID 146 may also be stored in memory 140 in the vehicle 120 for use in operating the vehicle 120 or its inward-facing/local systems in a personalized manner, e.g., playing music within the vehicle 120 matching musical preferences of the passenger 121, avoiding spinning or purposefully spinning the vehicle 120 along the ride path 168 based on the expectations/preferences 150 of the passenger 121, displaying video locally within the vehicle 120 to match the interests/goals/expectations 150 of the passenger 121, and the like.

The vehicle 120 also includes emotion/attention sensor(s) 132, which may include or overlap with the ID sensors 130 or may be provided as separate devices. For example, emotion and attention/interest determine software 134, 178 may be provided at the vehicle 120 or be provided only at the control system 170, and this software may be configured to process a digital image of the face of the passenger 121 to determine an emotional state or level of interest of the passenger 121 at a particular point in time (e.g., a point of travel of the vehicle 120 in the space 110 such as along one of the ride paths 168 or near one of the show elements 160).

As is known in the software industry (e.g., in the facial recognition and emotional state portion of this industry), a person's facial features and expressions may readily be processed to determine whether the person's emotional state matches more closely one of several emotional states such as a joyful or happy state because they are smiling or laughing, a sad state because they are frowning, and so on. Similarly, there are several software products presently on the market that can be used as software 134, 178 to determine a level of attentiveness or interest (e.g., level as defined on a numerical scale from no interest (or bored) to highly interested and attentive (or excited)), and these products may be similar to or match those used to identify an attentive or inattentive driver in non-automatic vehicles (e.g., to identify potentially drowsy drivers).

As shown in FIG. 1, the control system 170 may receive signals 143, 145 providing ID data 143 from the ID sensors 130 and emotion/attention data from the emotion/attention sensors 132, and this sensed data 185 per each vehicle 120 is stored in memory 184. The emotion and/or attention determination software 178 processes the sensed data 185 to determine a present or current passenger state 186 at least for one of the passengers 121 in the vehicle (e.g., the "driver" or person seated in a preselected seat in the vehicle 120). In other cases, the ID 187 and/or the state 186 is determined for two or more of the passengers 121 in the vehicle 120. In these cases, the control system 170 may act to select one of the states 186 or passenger IDs 187 for use in controlling 181 and 183 the vehicle 120 and the show elements 160, 162.

For example, the control system 170 may be configured to attempt to move all passengers 121 to a desired state (emotion equal to happy/joyful or attention level above a predefined minimum attention level), and, in such embodiments, the control system 170 may choose the passenger 121 with the "lowest" state (e.g., any state that is outside a goal/target range) as the controlling state for operating 181 the vehicle 120 and 183 the show elements 160, 162. For example, the vehicle 120 may include 2 to 4 passengers and if all have a state of "happy/joyful" the control system 170 may continue to operate in a "default" or preset manner (or with signals 181 to slow down to prolong the duration of the ride). However, if one passenger 121 has a state outside an accepted range (such as sad or not happy/joyful or inattentive rather than attentive/interested), the control system 170 may act to modify the vehicle 120 operations with signals 181 (e.g., to speed up and/or to move to another ride path 168 and/or to shorten the duration of the ride experience for these passengers 121) and/or the show elements 160, 162 with signals 183 (e.g., to change the operating state 161, 163 such as to change content being displayed, to interact with the out-of-state passenger 121, or the like).

As shown in FIG. 1, the ride system includes a ride or vehicle travel space 110 and, since the vehicle 120 is trackless, it may be controlled by signals 181 to its drive and navigation system 124 to move about the space 110 along two or more ride paths 168 (e.g., not a single path defined by a track as in many conventional park rides). The drive and navigation system 124 may include GPS, WiFi signaling, vision-based location devices, and/or other devices to monitor a current location of the automated trackless vehicle 120 within the space 110 (e.g., which ride path 168 is being followed, if any, and what point along the path 168 is the vehicle 120 within the space 110). This current location information may be shared with the control system 170 for its use in generating the vehicle control signals 181 (e.g., to stay on a path 168, to move to another path 168, and so on).

To this end, the control system 170 is shown to include a ride/vehicle controller 180 that may process the current passenger state 186 with or without additional consideration of the passenger ID 187 for the vehicle 120 to determine whether or not to transmit additional vehicle control signals. The vehicle controller 180 may retrieve a current ride path 192 for the vehicle 120, and, based on the current passenger state 186, determine whether a different ride path 192 should be assigned to the vehicle 120 to move it in space 110 as shown with ride path arrows 168. For example, the passenger ID 187 may be used to determine this is the first time the passenger 121 has been on the ride 100, and the ride path 192 may be chosen to cause the vehicle 120 to travel past each show element 160, 162 at a pace or rate (e.g., 0 to 10 feet per second or the like) to achieve a currently set ride throughput 196 stored in memory 184. In another example, the ID 187 may indicate the passenger 121 is a teenager that has been on the ride 100 several times and his/her ride goals/expectations 150 are for more thrilling aspects or more interactive aspects of the ride 100. In this example, the ride/vehicle controller 180 may act to choose one or more of the ride paths 192 to cause the vehicle to follow paths 168 in the space 110 to move the vehicle 120 past the thrilling and/or interactive show elements 160, 162 to meet the expectations 150 of the identified passenger 121 (or to go faster by the less thrilling and/or interactive show elements 160, 162 and slower past the more interactive and/or thrilling portions 160, 162).

Similarly, ride path 192 for each vehicle 120 may be set based on the current passenger state 186 such that the ride path 192 may be varied or switched during movement of the vehicle 120 through the ride space 110 (e.g., determine a first passenger state 186 at a first show element 160 that does not meet predefined goal states (e.g., happy or excited/surprised) and respond by switching ride paths 192 through the space to try to get the state to meet one of the predefined acceptable or goal states). In another example, the passenger's state may show that the level of attentiveness (or emotional state) does meet a desired goal or target range such as high level of attentiveness (or a desired emotional state predefined for a particular area within the ride space 110 as the target states may differ within a single ride 100 and its travel space 110). In this case, the vehicle 120 may be controlled 181 to continue at the existing pace along the presently assigned ride path 192 or even be caused to slow down to prolong the experiencing of the current state 186 by the passenger 121.

In many cases, the overall selections/use of the ride paths 192 to cause the vehicles to move along paths 168 in the space 110 as well as vehicle speeds provided by the drive and navigation system 124 are chosen to satisfy or meet the show/ride throughput settings 196 for the ride 100. The throughput 196 may be variable over a year or even within a day of operation such that the throughput can be increased during busy times of a theme park (e.g., when there are queues longer than some predefined amount) and decreased during less busy times (e.g., when average waits in the queues are less than some predefine amount of time). Hence, the rate of travel by the vehicle 120 and/or the length of the ride paths 192 may be varied by the controller 170 to meet the throughput settings 196 presently assigned to the ride 100. Further, since the vehicles 120 are trackless some of the vehicles 120 may be controlled 181 to remain in the space 110 longer than other ones of the vehicles 120 while still obtaining an overall show/ride throughput 196. This may be useful to implement with the ride/vehicle controller 180 to enhance the ride experience for all (or many) of the passengers based on their determined states 148, 186. As discussed above, vehicles 120 with passengers 121 not in states 148, 186 meeting preset state goals for passengers 121 for the ride 100 may be moved through the ride 100 more quickly (e.g., move passengers not interested in or not enjoying a ride through faster) while vehicles 120 carrying passengers 121 with states 148, 186 meeting or exceeding state goals for the ride 100 may be moved more slowly through the ride 100 (e.g., enhance the ride experience by extending the ride duration).

Further, the control system 170 may include show/entertainment controller 182 that acts to process the passenger ID 187 and/or the current passenger state 186 for a vehicle 120 and, in response, to issue show control signals 183 to control operations of the show elements 160, 162 such as by changing their operating state (which may include modifying displayed audio and/or visual content). As shown, the memory 184 is used to store a plurality of show element operating parameters (which may include content) 190, and the controller 182 may select one or more of these based on the passenger ID 187 and/or state 186. For example, it may be determined that the passenger 121 has a current state 148, 186 that is not matching a goal state (such as happy/joyful) while the vehicle 120 is nearby or adjacent the show element 160 on one of the ride paths 168. The controller 182 may respond by selecting a different set of operating parameters 190 and transmitting all or a portion of these to the show element 160 in control signals 183 to alter the operating state 161 of the show elements 161 to try to move the state 148, 186 into the desired state range or to match a goal state (move from not happy or uninterested to happy or interested). If sensed data 143, 145 shown at 185 is processed and provides a current state 186 that still does not match the goal state or range of states, the controller 182 may act to again choose different operating parameters 190 for use via signal 183 in controlling the show element 160 to operate in a different operating state 161. This can be repeated until a desired state is reached or until the vehicle is moved past the show element 168 along the ride path. Alternatively, the vehicle 120 may be moved to change paths 168 to move along to a different show element 160. In contrast to this example, the controller 182 may use the signals 183 to continue to operate one of the show elements 160, 162 in a present operating state 161, 163 when the current passenger state 148, 186 of the passenger 121 matched a goal state or is within a desired state range.

In the above examples, the controllers 180, 182 operate in response to a single state 148, 186 of a passenger 121 (e.g., by selecting the passenger 121 in a particular location/seat in the vehicle 120 or by selecting a passenger with a state that is out-of-range). In other implementations, though, the states 148, 186 of the passengers 121 (two or more states) may be combined by one or both of the controllers 180, 182 in order to generate the control signals 181, 183. For example, the states 148, 186 of two or more passengers 121 may be averaged to obtain a "vehicle state," such as happy/joyful, frightened, sad, or non-emotional or such as value on a range of levels of attentiveness or interest (e.g., a bored passenger 121 may be outweighed by two excited passengers 121). This vehicle state may then be used to determine whether or not to change the ride paths 168 for the vehicle, to speed up or slow down the vehicle 120 as it travels through the space 110, and/or to change the operating state 161, 163 of one or more of the show elements 160, 162.

Figure 2:
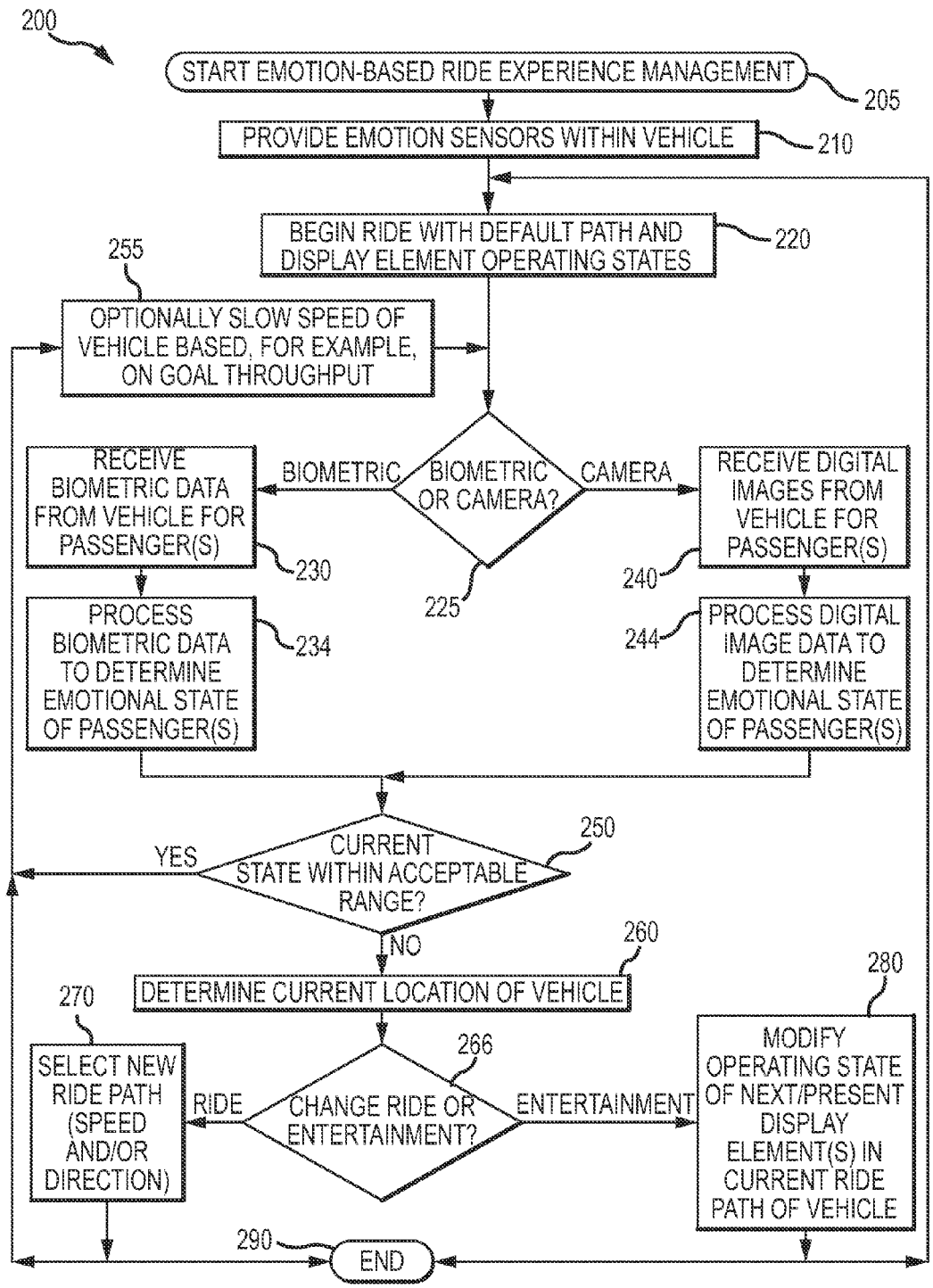
FIG. 2 shows a flow chart of a method of (or algorithm for) managing a passenger's ride experience based on emotional states of the vehicle's passenger(s) such as by operation of the ride system of FIG. 1.

FIG. 2 shows a method 200 of managing a passenger's ride experience based on emotional states of the vehicle's passenger(s) such as by operation of the ride system 100 of FIG. 1. The method 200 starts at 205 such as with designing and fabricating an amusement or theme park ride with automated trackless vehicles to carry passengers through a ride space with one or more display or show elements that are each operable to entertain the passengers. As discussed above, the display or show elements may include animatronics, robots, mechanical or electrical devices, and the like that are operable in one or more operating states to put on a show or otherwise entertain or interact with passengers of passing vehicles. The display or show elements may also include components and systems to provide audio content and/or video content on one or more projection/display surfaces, and the audio and video content may be varied so as to alter the content presented to vehicles passing by in the ride/travel space of the ride system.

Step 205 may also include designing and providing a controller for the ride/vehicle and a controller for the show/display elements that are operable to respond to determined emotional states of the passengers in the vehicles to modify operation of the vehicles and/or the operation of the show/display elements so as to maintain a present passenger state or to attempt to alter the present passenger state to enhance the passengers' ride experiences in the ride system.

The method 200 continues at 210 with providing emotional data sensors within or on the vehicle, e.g., inward looking sensors to obtain current status information pertaining to the vehicle's passengers. These sensors may include biometric-based sensors or digital image-based sensors. Biometric-based sensors (or physiological-based sensors) may include, but are not limited to, heart rate and/or blood pressure sensors, and these sensors may require one or more of the passengers to place a sensor in contact with their body (e.g., a sensor slipped over a finger) or to hold/contact a sensor pad with their hands. Digital image-based sensors typically will include still or video digital cameras that are positioned with their lens focused upon predicted positions of the face of one or more of the passengers in the vehicle, and these cameras are operated to capture digital images of the passengers during operation of the ride system for transmittal to the ride and/or entertainment controllers for processing.

The method 200 continues at 220 by operating the ride system in a first or default operating state. This may involve operating the display elements in a first or default operating state (e.g., using default/initial operating parameters and/or content). The ride vehicle may be loaded with one or more passengers in a passenger loading area in or outside the ride space, and the ride vehicle may be operated in step 220 to have the vehicle moving along a first or default ride path through the ride space at a predefined rate (or rates as the speed of the vehicle may be controlled to be constant or to vary at least once along the ride path as each ride path may be associated with one or more vehicle travel rates). The vehicle is automated and trackless such that the ride/vehicle controller operates to monitor the vehicle location in the ride space on an ongoing manner to control the vehicle's drive and navigation system to follow the ride path (at this point, the ride path is the default/initial path each vehicle may follow as it enters the ride/travel space of the ride system). In ride systems with a variable motion path, a ride capacity will simultaneously be useful in case of emergencies (e.g., a vehicle breaks down) as the vehicle can be directed on a new ride path for maintenance and problem solving and other vehicles can be more precisely moved around obstacles in traffic or in their present ride path.

At step 225, the method 200 continues with a determination of whether the emotion sensors are biometric/physiologic or image-based sensors. If the sensors are biometric, the method 200 continues at 230 with the biometric/physiologic sensor(s) collecting or sensing data from the passenger(s) and transmitting it to a controller (or control system). Once the biometric data (e.g., the passenger(s) heart rate or blood pressure) is received by the control system at 230, the method 200 can continue at 234 with processing of the biometric/physiological data to determine the current (or present) emotional state of the passenger(s) corresponding to the collected emotional state data. Step 234 may be performed with emotion determination software such as software module 178 of the control system 170. This software may act to compare the biometric/physiological value with a range of acceptable values for a particular ride system or with a predefined threshold value.

For example, a passenger may be expected to have an elevated heart rate when they are excited, joyful, happy, or in other similar emotional states, and it may be a ride designer's goal to have their heart beat in an elevated range when they are exposed to particular display/show elements or at certain points along a ride path. To this end, step 234 may involve comparing the passenger's heart rate with a predefined range of heart beats that have been associated with the desired emotional state for an average passenger. In other cases, step 234 may involve determining whether the particular passenger's heart rate has increased a desired percentage such as at least 10 percent increase, at least 20 percent, or some other minimum increase to indicate that their emotional state has changed to a desired state since the ride began at step 220.

At step 250, the method 200 involves the control system 170 determining whether the emotional state determined in step 234 is within the acceptable or target range or is above (or below) a predefined threshold value. If "yes," the method 200 continues at 255 with, optionally, slowing the rate of travel or speed of the vehicle so as to increase the length of time the passenger in the vehicle is exposed to portion of the ride path that they are presently enjoying (e.g., spend longer period of time nearby a particular show/display element in the ride space). Step may involve reducing the speed some predefined amount such as 10 to 50 percent reduction in speed (or more) or may even involve placing the vehicle in a holding pattern for some preset amount of time (such as hold the vehicle near a display element for 30 to 90 seconds or the like) prior to resuming travel along the ride path.

The decision of whether or not and how much to slow the vehicle in step 255 may be performed by a ride/vehicle controller (such as controller 180) based on a determination of whether or not such slowing or holding/pausing of travel can be performed while still obtaining a desired vehicle throughput for the ride. Hence, slowing in step 255 is "optional" because it may only be practical when the ride system is not presently at capacity or overly busy (e.g., not a waiting queue of a particular length or over some minimum amount). For example, a passenger visiting a theme park in an "off" or "low" season may have their ride experience lengthened in step 255 based on the their current emotional state whereas a passenger visiting the same theme park in the "high" season or particular day may not.

If at 250 it is determined the emotional state is not in a desired range or above (or below) a threshold value, the method 200 continues at 260 with determining the current location of the vehicle along the ride path (or within the ride space). For example, the vehicle may be located nearby a particular display element or traveling through a particular portion of the ride space. At step 266, the method 200 involves a determination by the control system whether to change the ride (or vehicle) operations or to modify the entertainment portion of the ride system. Note, both the ride and entertainment operations may be modified concurrently in some implementations of the method 200 with an either-or decision shown here for simplicity of explanation only.

If the ride is to be modified, the method 200 continues at 270 with the control system (or the ride/vehicle controller 180) operating to choose a new ride path for the vehicle. This may involve changing simply the speed or the route of the vehicle through the ride space or both. For example, a passenger may have an undesirable emotional state in a section of the ride space, and, in response, the control system may act at 270 to issue control signals to the vehicle (its drive and navigation system) to cause it to move to a different section of the ride space to try to change the emotional state of the passenger. This may involve causing the vehicle to follow a new ride path that moves it to a different display element (move on or skip the current display element) that may or may not have been experienced if the passenger's emotional state had been acceptable at step 250. This could also happen due to or in response to detection of an emergency (engine/motor problems or the like) or a traffic necessity (congestion, road maintenance, accidents involving other vehicles, and so on).

The new ride path may be the same length as the original ride path but expose the passenger to different entertainment (different display/show elements). In other cases, though, the new ride path may be shorter which can at least temporarily shorten the ride experience for the particular passenger and increase throughput for the ride system. This "shortening" can be utilized by another vehicle to obtain the same overall throughput for the ride such as by lengthening the time a vehicle containing passengers in an acceptable or targeted emotional state remain in the ride space. The change may be "temporary" as the vehicle may later have its ride path lengthened (e.g., if they later start to enjoy the ride experience). In this way, passengers can have their ride experience enhanced by shortening the ride for passengers that are not moved to a targeted emotional state (or range of states) and by lengthening the duration of the ride for those passengers most enjoying the ride (in the targeted emotional state or range of states for more of the ride). The method 200 may continue at 225 with further monitoring of the emotional state of the passenger or end at 290.

In step 266, it may be determined that the entertainment portion of the ride system is to be altered based on the emotional state. If so, the method 200 continues at step 280 with the control system (e.g., the show/entertainment controller 180 of system 170 in FIG. 1) operating to modify the operating state of at least one show/display element. The control system has determined in step 260 the current location of the vehicle within the show space, and, hence, step 280 may involve first determining the display element(s) that are presently adjacent or nearby to the vehicle or determining which display/show element(s) will next be adjacent or nearby to the vehicle as the vehicle continues to move along its present ride path in the ride/show space.

The control system can then respond to the present emotional state of the passenger by choosing a different set of operating parameters (or scripts) for the display elements and/or choosing a different content to display with the display/show elements. For example, the ride system may have a predefined set of operating parameters and content that are used to operate the display elements that are used to operate the display/show elements in the default or initial operating states. When a passenger, though, does not have a targeted emotional state when experiencing these display elements in these operating states, the operating state or states can be changed to try to affect the passenger's emotional state and inward-facing sensing can be used as feedback to determine whether changes in the operating state(s) are effective.

For example, a passenger may be a younger child who becomes bored with a first operating state that is too adult, and a new operating state can be used that includes more frantic movement of animatronics and/or animation and age-appropriate content (versus photographic-based content). In another example, the passenger may be a teenager, and the operations of the display may be changed from the first state toward more game playing or interactive operating states and/or the displayed content may be selected to be more age-appropriate for the passenger (e.g., more thrill or action-based). The variety of operating parameters and content that may be used and selected in step 280 is wide ranging and nearly endless, and it will be understood that the emotional state-based feedback loop provided by the method 200 can be used effectively to quickly change the operating state of the display/show elements to suit the particular passenger(s) of each vehicle presently experiencing the ride through the ride system.

In the method 200, step 225 may result in a determination that the emotional state sensors are cameras (or image-based sensors). If so, the method 200 continues from step 225 with step 240 which involves operating the inward facing cameras to obtain still or video images of one or more passengers in the vehicle, and the digital files from the camera(s) are transmitted to the control system for processing. For example, one or more digital cameras may be used to capture images of the passenger's face at a particular point in time in the ride space (or a plurality of images (e.g., over a period of 1 to 5 seconds) may be captured that can all be processed to determine an emotional state so as to avoid a misreading of emotional state (e.g., change facial expression due to upcoming sneeze or other temporary physical discomfort unrelated to ride experience)).

Once the control system (system 170 of FIG. 1) receives the digital images of the passenger's face (or additional portions of the passenger), the method 200 continues at 244 with processing the digital image data to determine the present emotional state of the passenger(s). For example, facial recognition/processing software (e.g., provided as part of the emotion determination software 178 in control system 170) may be used to process the image data to determine the passenger's facial expression, which may be correlated to an emotional state. A smile or laugh may be associated with a joyful, excited, or happy emotional state (e.g., a targeted emotional state or range of states) while no smile or a frown may be associated with a bored or unhappy emotional state (e.g., a non-targeted emotional state in some cases although the targeted emotional state may vary to practice the method 200 and system 100). Once the emotional state of the passenger (or passengers) is determined, the method 200 may continue at step 250 in a similar manner as when the emotional state is determined in step 234. In other cases, the physiological parameter may be a measure of their physical comfort in the vehicle, such as whether they are perspiring, show indications of being uncomfortably cold, or otherwise are comfortable with the present temperature within the vehicle, and the vehicle's onboard equipment (e.g., heater or A/C system) may be operated to modify the passenger's comfort level (e.g., to heat or cool the vehicle interior to achieve a new temperature or new cabin temperature range).

Figure 3B:
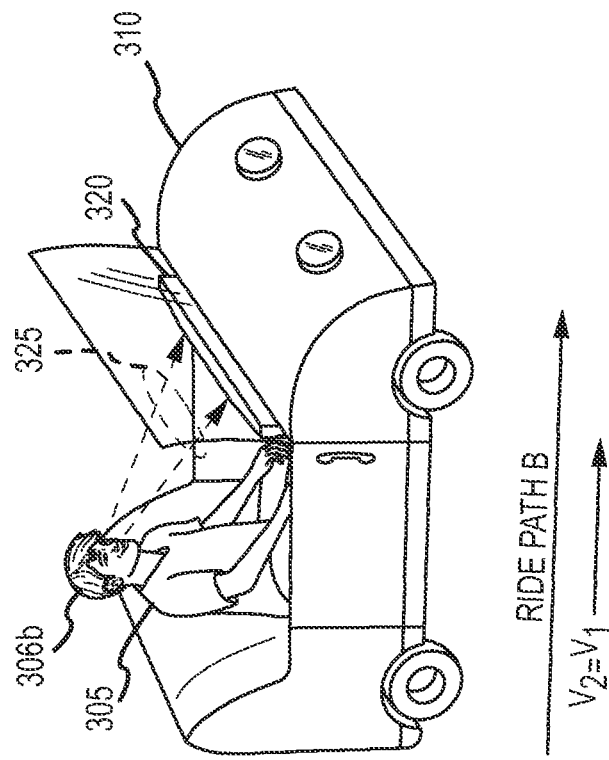
FIGS. 3A and 3B illustrate a portion of a ride system illustrating its operations to modify movement of the vehicle (changing the ride system operations) in response to passenger state.
Figure 3A:
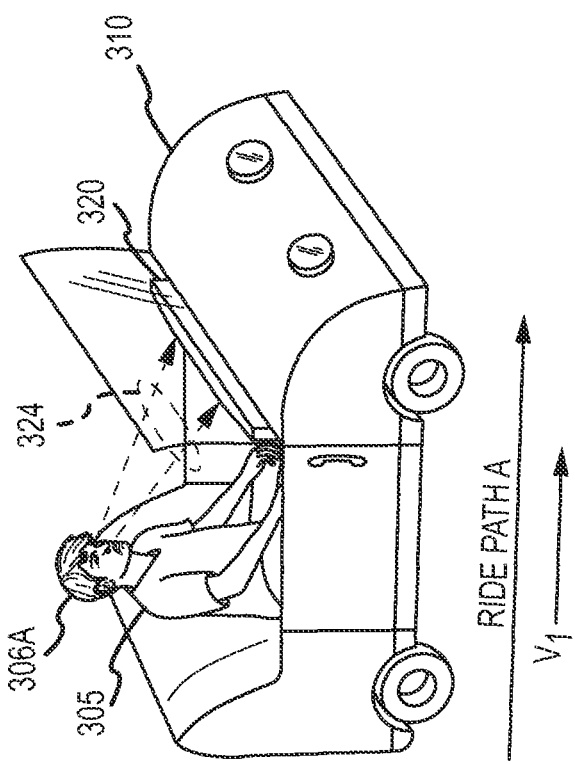

FIGS. 3A and 3B illustrate a portion of a ride system illustrating its operations to modify movement of a vehicle 310 (changing the ride system operations) in response to passenger state. The images provided in these figures are simplified but provide examples of use of a ride system (such as system 100 of FIG. 1) to implement a portion of control methods (e.g., method 200 of FIG. 2) described herein for automated trackless vehicles. As shown in FIG. 3A, a vehicle 310, which may take any of a variety of configurations useful for automated trackless vehicles, is being controlled (such as by an onboard or central/remote control system) to move along a first ride path (Ride Path A) at a first velocity ($V_1$). The vehicle 310 is a passenger vehicle, and a passenger 305 is seated in the body of the vehicle 310 to be moved along the first ride path (Ride Path A) with the vehicle 310. A vehicle ID (one that is provided with transmitted vehicle/passenger data or a vehicle identification element that can be read by a sensor outside the vehicle) may be taken into account or considered such as when the vehicle is empty (e.g., to move the empty vehicle out of the way or out of paths of other vehicles) or for other uses related to vehicle or external system operations based on vehicle ID.

Significantly, the vehicle 310 is outfitted with sensors for collecting data useful in determining the current state (e.g., emotional or attention state) of the passenger 305. As shown in this example, the vehicle 310 includes a camera 320 that captures (via reflected light) as shown at 324 a digital image of the face 306A of the passenger at a first time (which may be over a period of time in some cases). In other words, the image data 324 that is captured corresponds to when the vehicle 310 is moving along a first ride path (Ride Path A) at a first velocity ($V_1$). In this example, the passenger 305 is in a first emotional state that is not targeted or in a targeted emotional state range, e.g., the passenger 305 is unhappy or at least not happy/excited/joyful as shown by the expression on their face 306A. The control system software operates to process the image data 324 captured by the camera 320 to determine this first emotional state and to compare it to a targeted state or range of states to determine that it may be beneficial to modify the operations of the vehicle to change the passenger's emotional state (e.g., to move it into or towards the targeted state or state range).

To this end, FIG. 3B illustrates the same portion of the ride system after (or while) the vehicle 310 has been operated in response to the state of the passenger 305 at the first time shown in FIG. 3A. As discussed above, a control system may generate control signals that are transmitted to the vehicle 310 to cause its drive and navigation system to move from the first ride path (Ride Path A) onto a second ride path (Ride Path B) that differs from the first ride path (Ride Path A). In this way, the vehicle 310 may move along differing display elements or entertaining features of the ride system. Further, in this example, the change in vehicle operations resulting from the new set of control signals causes the vehicle 310 to travel at a second velocity ($V_2$) that differs from the first velocity ($V_1$), i.e., is faster or slower. The digital camera (emotion/attention detection sensor) 320 acts to capture image data as shown with arrows 325 including images of the passenger's face 306B during operation of the vehicle 310 in this second or new operating state. The control system processes this feedback emotional state data (image data in this example) to determine that the passenger 305 has a new or second emotional state, and comparison of the second emotional state may indicate the target emotional state or range of states has been achieved. As a result, the control system may continue to operate the vehicle 310 in this second operating state (e.g., until or unless the passenger's emotional state later changes so as to fall out of the desired emotional state range).

FIGS. 4A and 4B illustrate a portion of a ride system, similar to FIGS. 3A and 3B with like elements having like numbering, illustrating its operations to modify operation of a display element (e.g., changing displayed content) in response to passenger state. As shown in FIG. 4A, the vehicle 310 with passenger 305 is moving along a ride path (Ride Path A) at a particular velocity ($V_1$) and is nearby or adjacent a display element including a display or projection surface 450. Upon the display surface 450, first content is projected or displayed for enjoyment by the passenger 305. The sensor 320 is used to capture image data 424 when the vehicle 310 is positioned proximate to the display surface 450, and a control system is used to process this image data 424 that includes an image of the passenger's face 406A. The control system uses this facial image to determine the present emotional state of the passenger 305, and, in this example, the passenger 305 is not happy (or not excited or not interested). In many implementations of a ride system, the control system will determine that this current emotional state does not match the targeted emotional state or is outside the desired state range for a passenger 305. Hence, the control system may respond to the determined emotional state with a determination that it would be useful to modify the entertainment portion of the ride system to affect the passenger's emotional state.

To this end, FIG. 4B illustrates the same portion of the ride system as in FIG. 4A after the display element with display surface 450 has had its operating state changed. Particularly, the display surface 450 is no longer being used to display the content 454A but is, instead, being used (such as with one or more projectors) to display content 454B that differs from the content 454A (e.g., is changed from a more mature default content to a more kid-friendly default content or vice versa). With this content 454B displayed, the sensor 320 operates to capture image data 425 of the face 406B of the passenger 305. The control system may use this feedback state information to determine a new or second state of the passenger 305 that is happy, joyful, excited, or the like (e.g., shows high level of interest or attention), and the control system may determine that this new passenger state matches a targeted state or falls within a target range of states. In such a case, the control system may operate to continue to display the content 454B to keep the passenger 305 in this currently determined state. Further, the control system may operate other display/show elements based on this feedback such as by choosing content corresponding to the content 454B for display in display elements "downstream" on the ride path (Ride Path A) of the vehicle 310 (e.g., continue to show content appropriate for pre-teens, teenagers, or adults or for thrill seeking or for non-thrill seeking passengers 305). The control system may also operate the vehicle to address (or even solve in some cases) motion sickness issues for passengers such as by adjusting speed or movement patterns of a vehicle (e.g., adjusting speed of a vehicle relative to its environment or a nearby media display).

Figure 5:
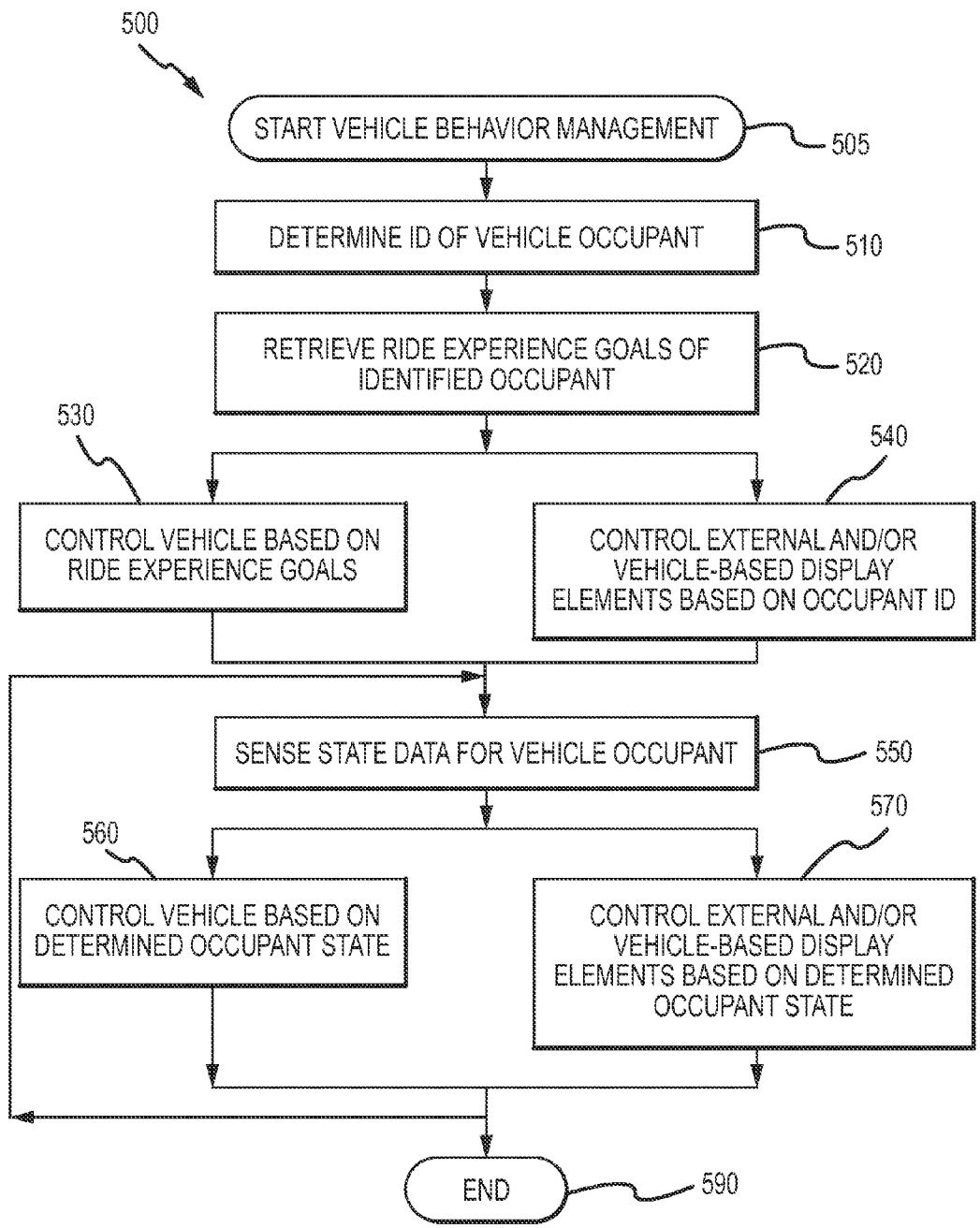
FIG. 5 illustrates a flow chart of a method of (or algorithm for) managing vehicle behavior based in part upon an occupant's (or passenger's) state.

In some embodiments of vehicle or ride experience management processes, it may be useful to base the management on the vehicle occupant or passenger alone or in combination with their state during a ride to enhance their experience. FIG. 5 illustrates a method 500 of vehicle behavior management that is adapted to take into account the occupant's identification (or ID). The method 500 starts at 505 such as with outfitting one or more automated trackless vehicles (which may be used in amusement park rides or on streets as transportation vehicles as is the case with the vehicle in system 100 of FIG. 1) with one or more sensors for collecting information from or about a passenger or occupant of each of the vehicles. Further, a control system may be provided in the system or the control system may be wholly or partially provided external to the vehicles with the sensors communicating in a wired or wireless manner with the control system. The control system in step 505 is configured to communicate with a drive and navigation system on each vehicle so as to be able to direct the vehicle to travel along one or more travel/ride paths at one or more speeds or travel rates.

The method 500 continues at 510 with determining an ID of an occupant (i.e., its passenger who does not have to drive or control the vehicle) of a particular vehicle. This may involve using an iris scanner to collect images of the occupant's iris or collecting other biometric data (e.g., a finger or palm print) with biometric sensors (e.g., an electronic pad for reading finger prints or palm prints) and communicating this biometric data to the control system. The control system processes this biometric data to determine the occupant's ID. In other cases, the vehicle may include an RFID reader and the occupant may wear or hold a device with an RFID chip that is programmed or designed to provide data that can be used by a control system to look up the ID of the occupant of the vehicle (e.g., an ID number that can be used to access a database in data storage that contains all potential occupants for the vehicle).

The method 500 continues at 520 with the control system using the determined occupant ID to retrieve or access one or more ride experience goals (or expectations) for the occupant. For example, the occupant may simply desire transportation while in the automated trackless vehicle and, hence, will not be wanting to interact with or be entertained by external display systems. In other cases, though, the occupant may have provided goals/expectations (e.g., by completing a questionnaire on a website or the like) that indicate they want to be educated during the ride, be entertained in a particular manner during the ride, be informed of sales on services or merchandise during the ride, and so on. In the same or other cases, the goals/expectations may indicate whether the ride experience should be a thrilling ride or be a smooth as possible ride (or a physical experience between these two relatively extreme ride experience descriptions).

The method 500 continues concurrently (or sequentially in some cases with little or no overlap) with steps 530 and 540. In step 530, the control system acts, such as through control signals sent to the drive and navigation system, to control the vehicle's operations based on the retrieved ride experience goals/expectations for the occupant. For example, the ride/travel path may be selected to meet the occupant's goals such as to take the path that can be completed at this time of day in the shortest period of time, to take a path that has the best scenery, to take a path that moves past a particular set of display elements, and the like. In another case, the vehicle may be caused to travel at a higher (or lower) rate of speed or in a particular lane on a street to meet the occupant's expectations. Alternatively, the rider may have asked for a more thrilling ride, and step 530 may involve selecting a path to achieve this goal or causing the vehicle to spin or take sharper corners to add thrill or a smooth ride may have been chosen and the control system may operate to take a straight and non-spinning ride path to a destination.

In step 540, the control system acts to control display elements based on the occupant's ID and/or their goals/expectations. For example, the display element may be in or on the vehicle and content may be chosen based on the occupant's ID (e.g., to play an audio or visual playlist associated with the vehicle occupant over a vehicle's audio and/or visual display system with the volume set at a default value for that occupant). In another example, the display elements may be external to the vehicle such as in a show assembly in a theme park ride or an electronic billboard along a roadway in a city or on a highway. The control system may operate these display elements based on the occupant's ID and/or their goals/expectations, e.g., to cause animatronic devices to behave in a way matching the goals/expectations of the occupant, to display entertainment, advertising, educational information, or the like to the occupant based on their viewing, purchasing, or educational history, or the like.

The method 500 then continues at 550 with using the emotion/attention sensors in the vehicle, and the control system may process this data to determine the present state of the occupant of the vehicle. As discussed above, this may involve measuring physiological characteristics of the passenger such as heart rate or breathing rate to determine the emotional state or level of attentiveness of the occupant. In other cases, images of the occupant's body or face may be processed to determine the emotional state or level of attention of the occupant.

Then, the method 500 continues with concurrent (or sequential) performance of steps 560 and 570. Steps 560 and 570 are similar to steps 250 to 280 of the method 200 and are not described again in detail here. Briefly, though, step 560 involves operating the vehicle based on the occupant's state determined in step 550, and this may involve using the drive and navigation system to continue "as is" if the state is within a desired state range (which may be defined by the occupant's ride experience goals/expectations), to move along a different path at the same or different speed to change the state, and so on. Step 570 involves controlling external and/or internal display elements (or other entertainment/education/information assemblies) based on the occupant's state. Again, the state determined in step 550 may be within an acceptable range (e.g., the passenger is happy or attentive and this is the desired state for the present ride experience), and the control signals would continue in the present mode.

However, if the state is outside the desired state range, step 570 may involve changing content or other operating parameters of the vehicle-based or external display elements (e.g., modify content, turn a display element off, change operating of mechanical and/or electronic components to interact or entertain differently, and so on) to try to affect a change in the state of the occupant. The method 500 may then continue at 550 with sensing a next state of the occupant to provide ongoing feedback (e.g., every 30 to 90 seconds or the like) to the control system on the occupant's state that can be used to control operation of the vehicle and other devices (e.g., display elements) that can affect/control the state of the occupant to try to move this state into a desired state range. Otherwise, the method 500 may end at 590 (e.g., when the vehicle arrives at a destination such as the occupant's travel destination in a transportation setting or when the vehicle arrives at the end of a ride in the theme/amusement park setting).

Although the invention has been described and illustrated with a certain degree of particularity, the particular implementations described in the present disclosure has been as examples, and numerous changes in the combination and arrangement of parts can be resorted to by those skilled in the art without departing from the spirit and scope of the invention, as claimed.

The method of managing operations of a vehicle and/or external display (or other) systems to enhance a passenger's overall ride experience is particularly well suited for use in theme or amusement parks as prior vehicle designers have attempted to use the field of mechatronics to change a ride whereas the inventor recognized that entertainment may be the best way (or field) to address the ride experience. The theme park ride experience, hence, acts as a model to prototype and address the question of how to modify/control the experience of a person in a self-driving vehicle (or as labeled often herein an automated trackless vehicle). Since the environment in a theme park ride is fully controllable, it allows one to test and address the passenger's ride experience challenge in a holistic manner. At the same time, the ride experience of the theme park can be revolutionized to use the control techniques described herein to offer a more qualitative ride experience while changing the way in which ride designers measure ride capacity and, in some cases, investments in developing, operating, and maintaining a park ride.

I claim:

1. A method of controlling a ride experience through a ride space of an amusement park ride, comprising:
   with a sensor mounted on or provide within an automated trackless vehicle being controlled to travel along a first ride path, sensing passenger data for a passenger of the automated trackless vehicle;
   processing the passenger data to determine a passenger state;
   determining a location of the automated trackless vehicle on the first ride path;
   based on the passenger state and the location of the automated trackless vehicle on the first ride path, determining a second ride path for the automated trackless vehicle to move through the ride space; and
   controlling the automated trackless vehicle to move off the first ride path and along the second ride path,
   wherein the sensor comprises a camera and the passenger data comprises a digital image of the face of the passenger,
   wherein the passenger state is an emotional state or a level of attention of the passenger generated during the processing of the passenger data based on a facial expression identified in the digital image of the face of the passenger, and
   wherein the processing step includes comparing the emotional state or the level of attention with ranges of values for emotional state or level of attention, respectively, that are predefined for the amusement park ride.

2. A method of controlling a ride experience through a ride space of an amusement park ride, comprising:
   with a sensor mounted on or provide within an automated trackless vehicle being controlled to travel along a first ride path, sensing passenger data for a passenger of the automated trackless vehicle;
   processing the passenger data to determine a passenger state;
   determining a location of the automated trackless vehicle on the first ride path;
   when the passenger state is outside a predefined range of passenger states for the amusement park ride, determining a second ride path for the automated trackless vehicle to move through the ride space; and
   controlling the automated trackless vehicle to move off the first ride path and along the second ride path,
   wherein the ride space includes first display elements along the first ride path and second display elements along the second ride path that differ from the first display elements, whereby the second ride path is selected during the ride experience to move the passenger state into or toward the predefined range of passenger states for the amusement park ride.

3. A method of controlling a ride experience through a ride space of an amusement park ride, comprising:
   with a sensor mounted on or provide within an automated trackless vehicle being controlled to travel along a first ride path, sensing passenger data for a passenger of the automated trackless vehicle;
   processing the passenger data to determine a passenger state;
   determining a location of the automated trackless vehicle on the first ride path;
   based on the passenger state and the location of the automated trackless vehicle on the first ride path, determining a second ride path for the automated trackless vehicle to move through the ride space; and
   controlling the automated trackless vehicle to move off the first ride path and along the second ride path,
   wherein the passenger data comprises a physiological parameter of the passenger, and
   wherein the processing comprises determining the physiological parameter is outside a range of goal values for the physiological parameter for a passenger during the ride experience.

4. The method of claim 1, wherein the passenger data comprises a physiological parameter of the passenger and wherein the processing comprises comparing the physiological parameter with a range of goal values for the physiological parameter for a passenger during the ride experience.

5. The method of claim 1, wherein the passenger data includes identifying information for the passenger, wherein the processing includes determining an identification of the passenger and, based on the identification, retrieving expectations for the ride experience for the passenger, and wherein the controlling.

6. The method of claim 1, wherein the ride space includes first display elements along the first ride path and second display elements along the second ride path that differ from the first display elements, whereby the second ride path is selected during the ride experience to alter the passenger state.

7. The method of claim 6, further comprising, prior to the controlling of the automated trackless vehicle to move along the second ride path, switching the operation of at least one of the first display elements from a first set of operating parameters to a second set of operating parameters based on the passenger state.

8. The method of claim 7, wherein the operating parameters include content displayed upon one or more display surfaces viewable by the passenger as the automated trackless vehicle moves along the first ride path, whereby the content is chosen based on the passenger state.

9. The method of claim 2, wherein the sensor comprises a camera and the passenger data comprises a digital image of the face of the passenger.

10. The method of claim 9, wherein the passenger state is an emotional state or a level of attention of the passenger and wherein the processing step includes comparing the emotional state or the level of attention with ranges of values for emotional state or level of attention, respectively, that are predefined for the amusement park ride.

11. The method of claim 10, wherein the determining and the controlling are only performed when the emotional state or the level of the attention is outside the ranges of values for emotional state or level of attention.

12. The method of claim 2, wherein the passenger data includes identifying information for the passenger and wherein the processing includes determining an identification of the passenger and, based on the identification, retrieving expectations for the ride experience for the passenger.

13. The method of claim 2, further comprising, prior to the controlling of the automated trackless vehicle to move along the second ride path, switching the operation of at least one of the first display elements from a first set of operating parameters to a second set of operating parameters based on the passenger state.

14. The method of claim 13, wherein the operating parameters include content displayed upon one or more display surfaces viewable by the passenger as the automated trackless vehicle moves along the first ride path, whereby the content is chosen based on the passenger state.

15. The method of claim 2, wherein the passenger data comprises a physiological parameter of the passenger and wherein the processing comprises comparing the physiological parameter with a range of goal values for the physiological parameter for a passenger during the ride experience.

16. The method of claim 3, wherein the passenger data includes identifying information for the passenger and wherein the processing includes determining an identification of the passenger and, based on the identification, retrieving expectations for the ride experience for the passenger.

17. The method of claim 3, wherein the ride space includes first display elements along the first ride path and second display elements along the second ride path that differ from the first display elements, whereby the second ride path is selected during the ride experience to alter the passenger state.

18. The method of claim 17, further comprising, prior to the controlling of the automated trackless vehicle to move along the second ride path, switching the operation of at least one of the first display elements from a first set of operating parameters to a second set of operating parameters based on the passenger state.

19. The method of claim 18, wherein the operating parameters include content displayed upon one or more display surfaces viewable by the passenger as the automated trackless vehicle moves along the first ride path, whereby the content is chosen based on the passenger state.

20. The method of claim 1, wherein the determining and the controlling are only performed when the emotional state or the level of the attention is outside the ranges of values for emotional state or level of attention.

* * * * *